United States Patent
Müller et al.

(10) Patent No.: US 11,527,007 B2
(45) Date of Patent: Dec. 13, 2022

(54) CAMERA FOR DETECTING AN OBJECT STREAM AND METHOD OF DETERMINING THE HEIGHT OF OBJECTS

(71) Applicant: SICK AG, Waldkirch (DE)

(72) Inventors: Romain Müller, Waldkirch (DE); Florian Schneider, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/073,600

(22) Filed: Oct. 19, 2020

(65) Prior Publication Data
US 2021/0125362 A1 Apr. 29, 2021

(30) Foreign Application Priority Data
Oct. 25, 2019 (DE) .......................... 102019128814.2

(51) Int. Cl.
*G06T 7/60* (2017.01)
*H04N 7/18* (2006.01)
(Continued)

(52) U.S. Cl.
CPC .............. *G06T 7/60* (2013.01); *G06T 7/215* (2017.01); *G06V 10/225* (2022.01); *H04N 7/188* (2013.01)

(58) Field of Classification Search
CPC ...... G01B 11/0608; G01C 11/04; G01C 3/00; G06T 7/215; G06T 7/60; H04N 5/2351;
(Continued)

(56) References Cited

U.S. PATENT DOCUMENTS

2009/0095047 A1* 4/2009 Patel .................... G06K 7/015
73/1.01
2010/0290665 A1* 11/2010 Sones .................. G01B 11/024
348/47
(Continued)

FOREIGN PATENT DOCUMENTS

CN 103516946 A 1/2014
CN 103791842 A 5/2014
(Continued)

OTHER PUBLICATIONS

U.S. Appl. No. 62/880,183, filed Jul. 30, 2019. (Year: 2019).*
(Continued)

*Primary Examiner* — Christopher S Kelley
*Assistant Examiner* — Kathleen M Walsh
(74) *Attorney, Agent, or Firm* — Nath, Goldberg & Meyer; Jerald L. Meyer

(57) ABSTRACT

A camera is provided that has an image sensor having a plurality of pixel elements for recording image data of an object stream moved in a direction of movement relative to the camera and having objects of a height, and a control and evaluation unit that is configured to determine the height of a respective object with reference to the image data. The image sensor here is an event-based image sensor and the control and evaluation unit is configured to detect a measurement series of points in time at which pixel elements adjacent in the direction of movement consecutively register an event to determine a speed of an object image of the object on the image sensor from said measurement series and from this the height.

15 Claims, 2 Drawing Sheets

(51) Int. Cl.
*G06V 10/22* (2022.01)
*G06T 7/215* (2017.01)

(58) Field of Classification Search
CPC ......... H04N 7/188; A24F 40/10; A24F 40/50;
A24F 40/57; A24F 40/60; G01R
19/16576; G05B 11/28; G06V 10/147;
G06V 10/225; G06V 40/20
USPC ............................................................ 348/135
See application file for complete search history.

(56) References Cited

U.S. PATENT DOCUMENTS

| | | | | |
|---|---|---|---|---|
| 2012/0314222 | A1* | 12/2012 | Stone | G01B 11/0608 |
| | | | | 356/601 |
| 2013/0307977 | A1* | 11/2013 | Saporetti | G06K 7/10752 |
| | | | | 348/143 |
| 2013/0335595 | A1* | 12/2013 | Lee | H04N 5/23229 |
| | | | | 348/231.5 |
| 2017/0124693 | A1 | 5/2017 | Ramalingam et al. | |
| 2018/0173983 | A1* | 6/2018 | Zink | G06V 10/469 |
| 2018/0284738 | A1* | 10/2018 | Menke | B65G 35/02 |
| 2021/0055445 | A1* | 2/2021 | Matsuoka | G01V 3/08 |
| 2022/0017085 | A1* | 1/2022 | Yokoyama | B60W 30/09 |

FOREIGN PATENT DOCUMENTS

| | | | | |
|---|---|---|---|---|
| CN | 1102433397 | A | 9/2019 | |
| DE | 102006004060 | B4 * | 9/2009 | ......... G01B 11/0608 |
| DE | 102017119084 | A1 * | 2/2019 | ........... B65G 47/244 |
| EP | 2693362 | A1 | 2/2014 | |
| EP | 3505961 | A1 | 7/2019 | |
| EP | 3663963 | A1 | 6/2020 | |
| JP | 2011232324 | A | 11/2011 | |
| JP | 2017181402 | A | 10/2017 | |
| JP | 2017187348 | A | 10/2017 | |
| JP | 2020170370 | A * | 10/2020 | ............ B60W 30/09 |
| WO | 2015036592 | A1 | 3/2015 | |
| WO | 2017174579 | A1 | 10/2017 | |
| WO | 2018073379 | A1 | 4/2018 | |
| WO | WO-2021021839 | A1 * | 2/2021 | ............... G01S 5/16 |

OTHER PUBLICATIONS

Yokoyama et al., English Translation of foreign priority data JP 2019-071687 A, filed Apr. 4, 2019. (Year: 2019).*

Gallego, et al. "A Unifying Contrast Maximization Framework for Event Cameras, with Applications to Motion, Depth, and Optical Flow Estimation"; IEEE Conference on Computer Vision and Pattern Recognition (CVPR); Salt Lake City Utah; 2018.

* cited by examiner

CAMERA FOR DETECTING AN OBJECT STREAM AND METHOD OF DETERMINING THE HEIGHT OF OBJECTS

FIELD

The invention relates to a camera for recording image data of an object stream moved in a direction of movement relative to the camera and having objects of a height and to a method of determining the height of objects of an object stream.

BACKGROUND

The optical detection of an object stream is an important application case for automation work in industry or logistics. The objects are frequently conveyed on a conveyor belt system between different process steps. Some automation work in this respect requires the detection of the three-dimensional contour of the objects and in particular a measurement of the height of the object or of the equivalent distance between the object and the camera with a known distance from the base surface. This in particular serves for a setting of the focal position of a camera objective or for a volume detection of the objects where the height does not only enter as a third dimension, but is also required to convert the surface of the object image in pixels of the camera into actual measurement units. A specific application example among many is the sorting of packages or other objects. Identification takes place here as a rule by reading an optical code. The package volume is, however, an important additional value and at least the height is an auxiliary value to focus correctly and to associate codes with the packages.

It is known in the prior art to associate an additional sensor with the camera, such as a laser scanner that takes over the geometry measurement. However, this means additional hardware effort and installation effort. 3D cameras that measure distances themselves, but are much more expensive with respect to 2D cameras and are not of the same quality in other properties such as the lateral resolution provide another solution. It is also conceivable to acquire the height from a plurality of image records in a time interval. The perspective of the object has thereby shifted and the height can thus be measured according to the principle of a stereo camera. This is, however, likewise complex and/or expensive and the height value is also available too late for a focus tracking, for example.

Much more recently, an innovative camera technique has arisen, the so-called event-based camera. It is also called a neuromorphological camera on the basis of the visual cortex. Such cameras have, however, not yet been used in said applications and they do not offer any possibility of measuring depth values and thus a height of a detected object. A conventional camera exposes all of its pixels at a regular refresh rate and then simultaneously reads them in order thus to acquire a number of stationary two-dimensional images per observed timer period corresponding to the refresh rate.

There is likewise a matrix of pixels in an event-based camera, but neither a fixed refresh rate nor a common reading of pixels. Instead, each pixel individually checks whether it determines a change in intensity. Image information is only output or read in this case, and indeed only by this pixel. Each pixel is thus a kind of independent motion detector. A detected movement is individually reported as an event. The event-based camera thereby reacts extremely quickly to the dynamics in the scene. The image data cannot be intuitively grasped by the human eye in this form because the static image portions are missing.

An event-based camera is, for example, described in a white paper by Prophesee that can be downloaded from their internet site.

Respective pixel circuits for an event-based camera are known from WO 2015/036592 A1, WO 2017/174579 A1 and WO 2018/073379 A1.

The paper by Gallego, Guillermo, Henri Rebecq, and Davide Scaramuzza, "A unifying contrast maximization framework for event cameras, with applications to motion, depth, and optical flow estimation", IEEE Int. Conf. Comput. Vis. Pattern Recog. (CVPR), Vol. 1. 2018 presents methods on how movement, distances, and optical flow can be determined from the data of an event-based camera.

US 2013/0335595 A1 discloses an apparatus and a method for event-based image processing, specifically on determining the optical flow that is, as already mentioned, however, a particularly complex and expensive tool.

An event-based camera is used for code reading in the still unpublished European application having the file reference 18209953.1.

SUMMARY

Against this background, it is the therefore the object of the invention to improve the height measurement in an object stream by means of a camera.

This object is satisfied by a camera for recording image data of an object stream moved in a direction of movement relative to the camera and having objects of a height and to a method of determining the height of objects of an object stream in accordance with the respective independent claim. The camera has an image sensor having a plurality of pixel elements, for example in a linear or matrix arrangement. Image data of an object stream of objects that move relative to the camera are thus recorded. The height of these objects is determined by evaluating the image data. Height here means the extent in the direction toward the camera. If the camera does not observe from above, it is still the height from the view of the camera even if it would objectively rather be the width, for instance with a side perspective of the camera.

The invention starts from the basic idea of using an event-based image sensor as the image sensor. The camera is therefore an event-based camera instead of a conventional camera having a conventional image sensor. The differences were briefly discussed in the introduction. The pixels respectively recognize changes in the intensity instead of simply measuring the respective intensity. Such a change that should preferably be fast enough and should exceed a noise level is one of the eponymous events. In addition, signals are only provided or read on such a change in the intensity, and indeed only by the respective pixel or the respective pixels. The name event-based image sensor stands for the detection principle independently of other conceivable names such as a neuromorphological image sensor.

To determine the height of an object, a measurement series is formed when pixels respectively adjacent in the direction of movement trigger an event, that is when an object edge respectively passes through the field of view of the pixel. In principle, two adjacent pixels are sufficient for a linear estimate; however, more and also substantially more adjacent pixels are preferably used and for this purpose a number is available in the order of magnitude of the row or column resolution of the event-based image sensor. If these points in time are now arranged above the respective triggering pixel, this produces a discrete estimate of the function of the time of the event in dependence on the pixel and thus on the location on the image sensor in the direction of movement. This function is compressed or stretched in accordance with the speed at which the object image of the detected object moves over the image sensor. This speed may not be confused with the objective speed of the object in real space. The speed of the object image on the image sensor varies with the proximity of the object and thus of its height so that this speed can be converted into the sought height or already measures this height up to a constant conversion factor.

The invention has the advantage that the height of the objects can be determined in a particularly simple and robust manner thanks to the event-based image sensor. The development effort and the required calculation capacities are thereby substantially reduced. The moved object edges are automatically recognized due to the event-based detection. A large number of conventional image processing steps are dispensed with such as background segmentation, object recognition, object tracking over a plurality of frames to determine their movement. The event-based image sensor is moreover insensitive to extraneous light. CW light does not cause any intensity change and consequently does not trigger any events in the pixels. A modulated light source such as a halogen lamp modulated at 50 Hz can be suppressed by the control and evaluation unit.

A respective pixel element preferably determines when the intensity detected by the pixel element changes and delivers event-based image information at exactly this time. The special behavior of the pixel elements of an event-based camera has already been addressed multiple times. The pixel element checks whether the detected intensity changes. Only that is an event and image information is only output or read on an event. A type of hysteresis is conceivable in which the pixel element still ignores a defined change of the intensity that is still too small and does not consider it an event.

The pixel element preferably delivers differential information as to whether the intensity has decreased or increased as the image information. The information read from the pixel element is therefore, for example, a sign +1 or −1 depending on the direction of change of the intensity. A threshold for intensity changes can be set here up to which the pixel element still does not trigger an event. In a subsequent internal representation for a further evaluation, the value 0 can be added for times at which no event had been detected.

The pixel element preferably delivers an integrated intensity as the image information in a time window determined by a change of the intensity. The information is here not restricted to a direction of the change of intensity, but the incident light is integrated in a time window fixed by the event and a gray value is thereby determined. The measured value thus corresponds to that of a conventional camera, but the point in time of the detection remains event-based and coupled to a change of intensity.

The respective pixel element provides image information preferably having a refresh frequency of at least one KHz or even at least ten KHz. The refresh frequency of a conventional camera is the refresh rate or frame rate. Such a common refresh rate is unknown to the event-based camera since the pixel elements output or refresh their image information individually and on an event basis; however, there are extremely short response times here which would only be able to be achieved with a conventional camera at huge costs with a thousand or more frames per second; with a refresh frequency still possible with an event-based camera, this would no longer be reproducible technically with a conventional camera. This high temporal resolution also has the advantage that there is practically no motion blur. An object does not move by a multiple pf pixels within one of the extremely short refresh periods that corresponds to a conventional exposure time and no blurred image is thus recorded.

The image sensor preferably produces a data flow as the image information from events that each have coordinate information of the associated pixel element, a piece of time information, and a piece of intensity information. A conventional data stream comprises the intensity values or gray values of the pixels and the spatial reference in the image sensor plane is produced in that all the pixels are read in an ordered sequence. In the event-based image sensor, data tuples per event are instead preferably output that make the event associable. The location of the associated pixel element, the direction ±1 of the intensity change, and/or the intensity measured at the event, and a time stamp are recorded here. Only a few data thereby have to be read despite the higher effective refresh rate.

The data stream is preferably converted by filling with zeroes into a matrix whose base is formed by the arrangement of the pixel elements on the image sensor and by the time. A usual matrix representation is frequently more suitable for the further processing and consists of a sequence of single frames consecutive in time, i.e. of layers of the respective intensity distribution over the pixel elements of the image sensor recorded at a fixed point in time and strung together over time. The granulation of the direction of time would conventionally be preset by the frame rate; it can be fixed with a lot more fineness with an event-based camera. A sparse matrix is ultimately produced by the events; the data stream from the event-based image sensor corresponds to a representation saving memory and bandwidth.

The adjacent pixel elements preferably form at least one row arrangement on the image sensor. It can be achieved by a corresponding alignment of the camera with respect to the direction of movement that the row arrangement agrees with the rows or columns of the event-based image sensor. The row arrangement otherwise forms a line through a plurality of rows and columns. In principle, a row arrangement is sufficient to measure the speed and thus the height. However, a plurality of the row arrangements present, or even all of them, in the direction of movement are preferably evaluated for the height determination. For on the one hand, the lateral position of the respective object is not known a priori. On the other hand, the use of a plurality of rows for an agreement or for a redundant measurement having a higher accuracy overall can be advantageous.

The camera is preferably installed as stationary at a conveying device on which the objects are conveyed. An important group of applications is thus covered. The conveyed objects form the object stream. Their direction of movement and speed are thus just as equally fixed as the height of the conveyor belt as a reference for the height measurement.

The speed of the objects is preferably predefined for the control and evaluation unit, in particular by parameterization or connection to a further sensor or to a higher ranking control. It is not the speed of the object image on the image sensor that is meant here, but rather the actual speed of the object. This speed is known in advance in some embodiments and can be parameterized, for instance with a fixed conveying speed. It is alternatively conceivable that it is measured externally, for example using incremental encoders at a conveyor belt, or that a conveyor control transfers the speed at which the object stream is also moved.

The control and evaluation unit is preferably configured to determine the speed of the objects from the image data in that the speed of the object image of a reference object at a known distance is determined, in particular a conveyor belt. The camera can also measure the speed itself. For this purpose, it relates its measurement of the speed of the object to a reference object at a known distance. The conveyor belt can in particular be considered for this.

The control and evaluation unit is preferably configured to recognize an optical marker of the reference object, in particular a modulated light source. The optical marker serves to recognize the reference object at a known distance more simply and more reliably as such. The optical marker can be passive, for instance in the form of transverse strips on the conveyor belt. Alternatively, light sources are used as optical markers that use a characteristic flashing sequence, in the simplest case at a specific modulation frequency.

The relative movement of the object stream is preferably uniform and the control and evaluation unit is configured to determine a straight compensation line of the measurement series and its slope as a measure for the height. The determination of the height by means of an event-based image sensor is simplified even further for the frequent case of an at least substantially constant speed of the objects. The measurement series or the discrete function of the events triggered consecutively in adjacent pixels along the direction of movement thereby acquired then namely becomes a straight line. The parameters of this straight line can be reconstructed by a straight compensation line. It is sufficient for this purpose in the simplest case to use two arbitrary events, preferably at a larger or maximum pixel spacing. Otherwise, all the known algorithms for a straight line fit are available that include a plurality of or all the points of the measurement series. The slope of the straight lines is in turn in a linear relationship with the sought height, that is it only has to be converted by a factor given by parameters of the camera and its installation position.

The objects preferably have a planar surface facing the camera. This is the case with a very large number of packages. With a planar top surface, the distance of the object does not change during the movement through the field of view of the camera. Deviations from this condition of a planar surface in no way restrict the application of the teaching in accordance with the invention; however, they do result in certain measurement errors of the then non-scalar height.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
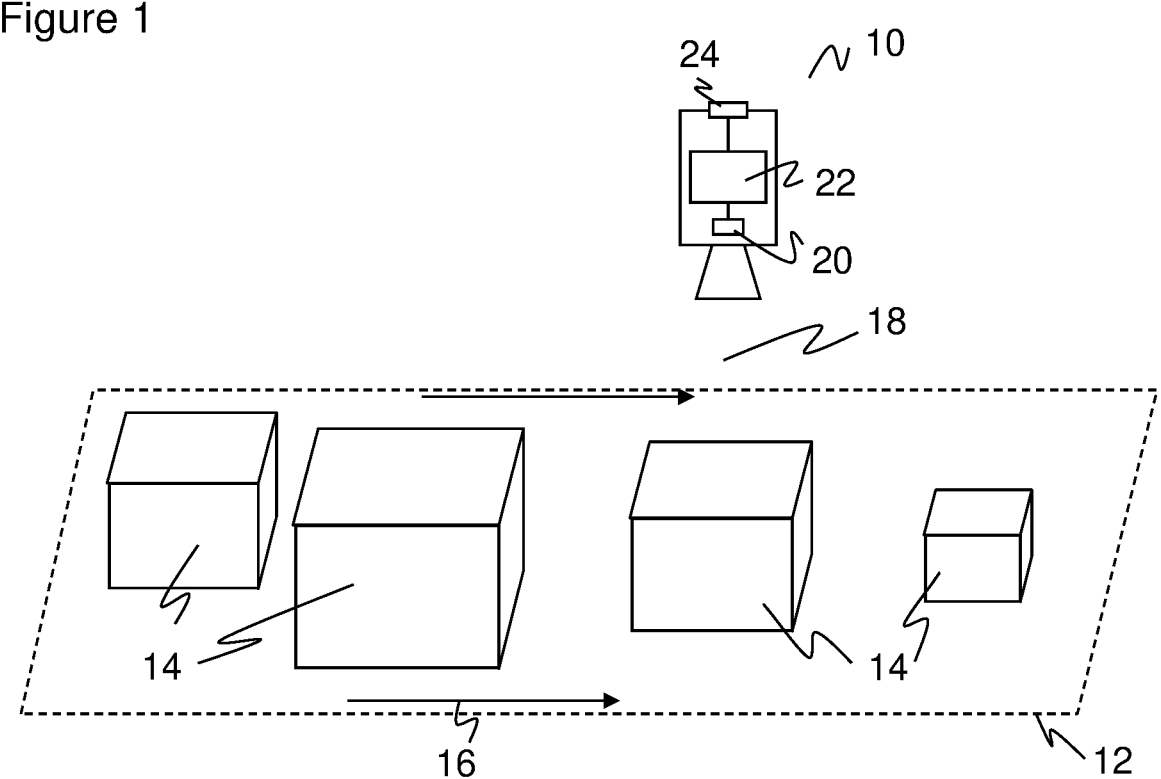
FIG. 1 a representation of a camera that is installed above a conveying device with objects conveyed thereon.

FIG. 1 shows a camera 10 which is mounted above a conveyor belt 12 which conveys objects 14 through the field of view 18 of the camera 10, as indicated by the arrow 16. This stationary use of the camera 10 at a conveyor belt is very common in practice. The invention, however, initially relates to the camera 10 itself so that neither the particularly advantageous perspective from above nor the application example in total may be understood as restrictive.

The camera 10 detects image information of the conveyed objects 14 by an image sensor 20. This image sensor 20 is an event-based image sensor and the special features of an event-based image sensor and of the evaluation of its image information will be explained in more detail further below. Event-based cameras require dynamics in the recorded scene as otherwise no events are registered. Assembly line applications are therefore a suitable application since there is a movement of the objects 14 to be recorded. The optical detection principle using the image sensor 20 is not bound to any particular geometry or any determined camera design. The image sensor 20 as a rule comprises a matrix arrangement or row arrangement of pixels.

The actual task of the camera 10 plays a secondary role for the explanation of the invention. The objects 14 are tested or measured for specific features, for example. A further development as a camera based code reader is also conceivable with which then code regions on the objects 14 are detected and the codes applied there are read. The focus in this description is on a measurement of the height of the objects 14 that is determined as the actual measurement value or as an auxiliary value.

A control and evaluation circuit 22 is connected for these evaluations to the image sensor 20 and reads and further processes its image information. The camera 10 outputs information via an interface 24. The function of the control and evaluation unit 22 can also be at least partially provided externally while utilizing the interface 24, for instance by connection to a higher ranking control, to a network, or to a cloud. Conversely, the camera 10 can receive information from further sensors or from a higher ranking control via the interface 24 or via a further interface. It is thereby possible, for example, to communicate a fixed or current conveying speed of the conveyor belt to the camera 10.

Figure 2:
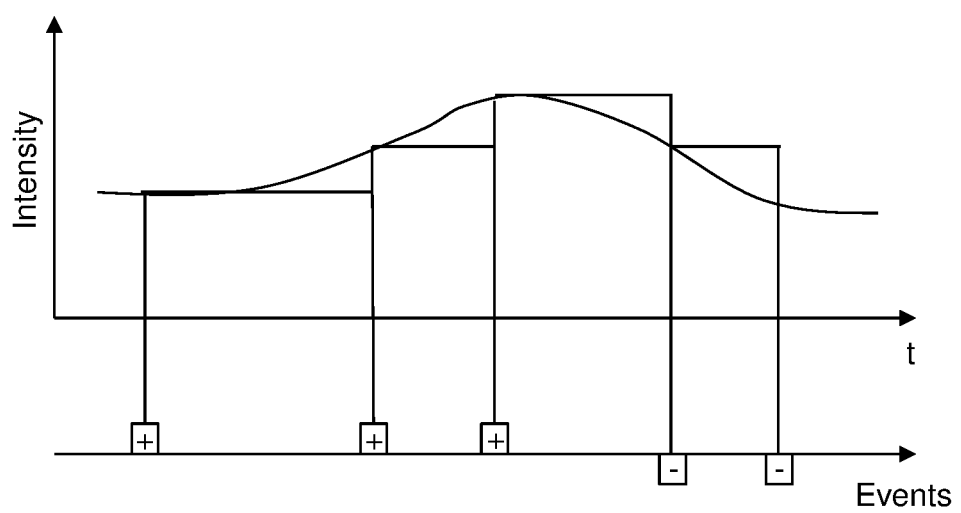
FIG. 2 an exemplary intensity distribution of a pixel for explaining an event-based detection of image information.

FIG. 2 shows in the upper part for the explanation of the functional principle of the event-based image sensor 20 a purely exemplary temporal intensity development in a pixel element of the image sensor 20. A conventional image sensor would integrate this intensity development over a predefined exposure time window; the integrated values of all the pixel elements would be output in the cycle of a predefined frame rate and then reset for the next frame.

The pixel element of the event-based image sensor 20 instead reacts to an intensity change individually and independently of a frame rate. Points in time at which an intensity change was found are respectively marked by perpendicular lines. Events at these points in time are shown in the lower part of FIG. 2 with plus and minus in dependence on the direction of the intensity change. It is conceivable that the pixel element does not react to any and all intensity changes, but only when a certain threshold has been exceeded. The pixel element is read in an event-based manner at those points in time at which an intensity change has been recognized and then outputs the sign. The image information can subsequently still be supplemented by the value zero at those times at which there was no event so that an image arises over all the pixel elements of the image sensor 20. This image, unlike as usual with conventional images, only indicates the moving edges, either object contours, shadows, or prints.

There are also integrating event-based cameras in addition to such differential event-based cameras. They react in a very analogous manner to intensity changes. Instead of outputting the direction of the intensity change, however, the incident light is integrated in a time window predefined by the event. A gray value is thereby produced. Differential and integrating event-based cameras have a different hardware design and the differential event-based camera is faster since it does not require any integration time window. Reference is additionally made to the patent literature and scientific literature named in the introduction with reference to the technology of an event-based camera.

A sparse three-dimensional data record is produced by the event-based detection of image information since unlike with a conventional camera every pixel element does not deliver image information for a fixed time, but only those that that registers an event in the form of an intensity change. An event is, for example, output as a tuple having the sign of the intensity change with a differential event-based camera or with a gray value with an integrating event-based camera, the pixel position on the image sensor 20 in the X and Y directions and a time stamp. Such events can be added to again to form a conventional matrix by filling up with zeros in a downstream process. Two dimensions then correspond to the pixel arrangement on the image sensor 20. If the time is also taken into account, a three-dimensional matrix is produced whose layers are each two-dimensional movement images and whose third dimension is the time, preferably with an extremely high time resolution in the range of at most a few microseconds or even lower. This corresponds to a film having frames formed by the layers, but at an unusually high frame rate and only a few pixels different from zero.

Figure 3:
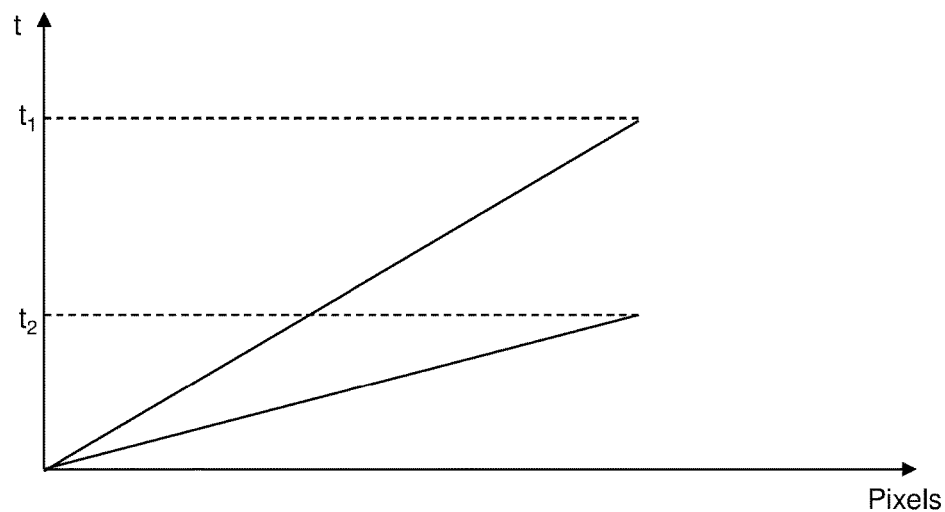
FIG. 3 exemplary measurement series of points in time at which pixels adjacent in a direction of movement trigger an even due to an object edge for a slow and a fast object.

FIG. 3 illustrates how different speeds of the objects 14 are reflected in the data record. Only one row of pixels oriented in the conveying direction and thus one spatial dimension is looked at in this respect. If an object 14 enters into the field of view 18 of the camera 10, these pixels will consecutively register an event, for example triggered by the moving front edge or by other structures of the object 14 moved by the conveyor belt 12. The corresponding points in time of these events are entered on the Y axis in FIG. 2 in dependence on the pixel number and thus on the pixel position in the direction of movement.

A measurement series of points of time at locations on the image sensor 20 is thus produced by which the movement of the object image on the image sensor 20 is described. With a uniform movement of the object 14, this is a straight line; phases of the acceleration would be expressed in rising or falling curve sections depending on the sign. The discrete measurement series can be connected to form a continuous measurement curve or a straight line.

The measurement series is compressed or elongated depending on the speed of the object image on the image sensor. Examples for two uniformly moved objects 14 of which one is twice as fast as the other are shown in FIG. 3. The one straight line accordingly has twice the slope of the other and the ratio of the end points in time $t_1$ and $t_2$ at which the slower object or the faster object respectively exits the field of view 18 is one to two. In a simple evaluation, the speed of the object image on the image sensor 20 could therefore already be measured by these end points in time. The slope of a straight line can also be determined from any desired two other measurement points or even from every single measurement point under the condition of a common origin. A straight compensation line for a plurality of or for all measurement points is more robust.

Figure 4:
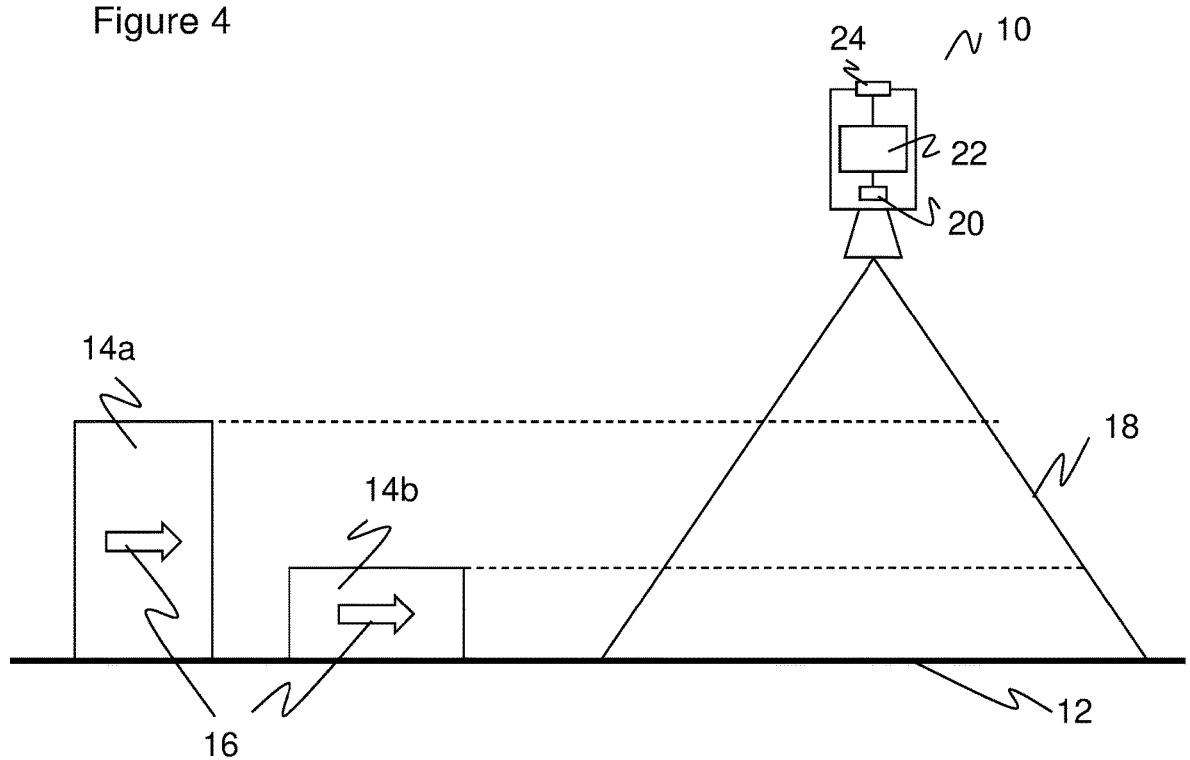
FIG. 4 a schematic sectional view of the field of view of an event-based camera through which the objects of different height are conveyed.

FIG. 4 shows a schematic sectional view of the camera 10 and its field of view 18 as well as two objects 14*a-b* of different heights that are conveyed through the field of view 18. Since the lateral extent of the field of view 18 decreases as the proximity to the camera 10 increases, the speed perceived by the camera 10 for higher objects 14*a* is greater than for lower objects 14*b*. This relationship is even linear in accordance with the intercept theorem. It is important here to distinguish between the perceived speed, that is the speed of the object image on the image sensor 14 in pixels/time, and the real speed of the objects 14*a-b*. The latter is naturally completely independent of the height of the objects 14*a-b*.

With knowledge of the real speed and of the camera parameters, in particular of the installation height above the conveyor belt 12, the perceived speed measured from the image data can therefore be converted into the height of the objects 14*a-b*. Specifically for this purpose, with a uniform movement, only the slope of the straight lines illustrated in FIG. 3 have to be determined and rescaled with a factor.

In this respect, the speed of the conveyor belt and thus of the objects 14*a-b* is parameterized, measured by external sensors, in particular incremental encoders, or is communicated from a higher ranking control that in turn predefines the speed or measures it with its own sensors. It is also conceivable to provide the conveyor belt 12 with optical markers and to measure their perceived speed using the method described. Since the distance of the camera 10 from the conveyor belt 12 is known, this perceived speed can be converted into the real speed. The optical markers make it possible to reliably recognize the otherwise structureless conveyor belt 12. Active markers, for instance with LEDs running along with the conveyor belt, preferably serve this purpose. They can even produce an unambiguously recognizable optical code, for instance a flashing sequence, with a regular repetition at a specific frequency often being sufficient.

The invention claimed is:

1. A camera comprising:
   an image sensor having a plurality of pixel elements for recording image data of an object stream moved in a direction of movement relative to the camera and the object stream having objects of a height, and
   a control and evaluation unit that is configured to determine the height of a respective object with reference to the image data,
   wherein the image sensor is an event-based image sensor responsive to a predetermined temporal intensity development in a pixel element of the image sensor, and
   wherein the control and evaluation unit is configured to detect a measurement series of points in time at which pixel elements adjacent in the direction of movement consecutively register an event to determine a speed of an object image of the respective object on the image sensor from said measurement series and from the determination of the speed of the object image, the height of the respective object.

2. The camera in accordance with claim 1,
wherein a respective pixel element determines when the intensity detected by the pixel element changes and delivers image information in an event-based manner at exactly this time.

3. The camera in accordance with claim 2,
wherein the pixel element delivers as the image information differential information on whether the intensity has decreased or increased and/or delivers an integrated intensity in a time window determined by a change of the intensity.

4. The camera in accordance with claim 1,
wherein the adjacent pixel elements form at least one row arrangement on the image sensor.

5. The camera in accordance with claim 1,
wherein the adjacent pixel elements form a row or column of a matrix arrangement.

6. The camera in accordance with claim 1,
wherein the camera is installed as stationary at a conveying device on which the objects are conveyed.

7. The camera in accordance with claim 1,
wherein a speed of the objects is predefined for the control and evaluation unit.

8. The camera in accordance with claim 1,
wherein a speed of the objects is predefined for the control and evaluation unit by parameterization or connection to a further sensor or to a higher ranking control.

9. The camera in accordance with claim 1,
wherein the control and evaluation unit is configured to determine a speed of the objects from the image data in that a speed of the object image of a reference object at a known distance is determined.

10. The camera in accordance with claim 9,
wherein the reference object is a conveyor belt.

11. The camera in accordance with claim 9,
wherein the control and evaluation unit is configured to recognize an optical marker of the reference object.

12. The camera in accordance with claim 11,
wherein the optical marker of the reference object is a modulated light source.

13. The camera in accordance with claim 1,
wherein the relative movement of the object stream is uniform; and wherein the control and evaluation unit is configured to determine a straight compensation line of the measurement series and its slope as a measure for the height.

14. The camera in accordance with claim 1,
wherein the objects have a planar surface facing the camera.

15. A method of determining the height of objects of an object stream moving in a direction of movement the method comprising:
recording image data of the object stream by an image sensor with a plurality of pixel elements and are evaluated to determine the height of a respective object,
wherein the image data are recorded by an event-based image sensor responsive to a predetermined temporal intensity development in a pixel element of the image sensor,
wherein a measurement series of points in time is detected at which pixel elements adjacent in the direction of movement consecutively register an event,
and wherein a speed of an object image of the respective object on the image sensor is determined from said measurement series and from the determination of the speed of the object image, the height of the respective object.

* * * * *